United States Patent [19]
Bahls et al.

[11] Patent Number: 5,706,513
[45] Date of Patent: Jan. 6, 1998

[54] SYSTEM AND METHOD FOR QUEUING AN RETRIEVING DATA OBJECTS TO AND FROM A SHARED STORAGE MEDIUM

[75] Inventors: Jim W. Bahls, Pleasanton; George S. Denny, San Jose; Richard G. Hannan, San Jose; Janna L. Mansker, San Jose; Bruce E. Naylor, Morgan Hill; Betty J. Patterson, San Jose; Sandra L. Stoob, Morgan Hill; Judy Y. Tse, San Francisco; Anu V. Vakkalagadda, San Jose, all of Calif.

[73] Assignee: International Business Machines Corporation, Armonk, N.Y.

[21] Appl. No.: 508,826

[22] Filed: Jul. 28, 1995

[51] Int. Cl.$^6$ .................................................. G06F 17/30
[52] U.S. Cl. ................................................. 395/621; 395/616
[58] Field of Search .............................. 395/182.04, 616, 395/620, 619, 621, 622; 360/48; 380/25; 358/468; 346/6

[56] References Cited

U.S. PATENT DOCUMENTS

| | | | |
|---|---|---|---|
| 5,249,231 | 9/1993 | Covey et al. | 380/25 |
| 5,276,860 | 1/1994 | Fortier et al. | 395/182.04 |
| 5,319,453 | 6/1994 | Copriviza et al. | 346/6 |
| 5,465,167 | 11/1995 | Cooper et al. | 358/468 |
| 5,592,342 | 1/1997 | Hall et al. | 360/48 |

*Primary Examiner*—Thomas G. Black
*Assistant Examiner*—Buay Lian Ho
*Attorney, Agent, or Firm*—Sterne, Kessler, Goldstein & Fox P.L.L.C.; Prentiss W. Johnson, Esq.

[57] ABSTRACT

A system and method for interacting with a shared storage medium comprising a ready queue and a staging queue is described. To store a data object, whether the data object is larger than available storage capacity of a working storage associated with an application is first determined. If the data object is larger than available storage capacity of the working storage, then a private key for the data object is generated. The application then divides the data object into N segments, and causes segments 2 through N to be stored in the staging queue via the working storage. The private key is stored with each of segments 2 through N in the staging queue. Then, the application causes segment 1 of the data object, the public key, and the private key to be stored in the ready queue. To retrieve a data object, an application causes a record having a public key stored therein to be retrieved from the ready queue. Stored in the record are at least a portion of a data object and a private key. The application determines whether any segments of the data object are stored on the staging queue. If one or more segments of the data object are stored on the staging queue, then the application causes any records having the private key stored within them to be retrieved from the staging queue in the order in which the records were stored on the staging queue.

22 Claims, 6 Drawing Sheets

SYSTEM AND METHOD FOR QUEUING AN RETRIEVING DATA OBJECTS TO AND FROM A SHARED STORAGE MEDIUM

CROSS-REFERENCE TO OTHER APPLICATIONS

The following application of common assignee contains some common disclosure, and is believed to have an effective filing date identical with that of the present application. "COMPUTER PROGRAM PRODUCT FOR QUEUING AND RETRIEVING DATA OBJECTS TO AND FROM A SHARED STORAGE MEDIUM," application Ser. No. 08/508,547, filing date Jul. 28, 1995.

DESCRIPTION

1. Technical Field

The present invention relates generally to data storage and retrieval in a data processing environment, and more particularly to queuing and retrieving data objects to and from a shared storage medium.

2. Background Art

In some data processing systems, a plurality of applications store data in and retrieve data from a shared storage medium. Each application typically has available for its use a working storage. The working storage represents a finite amount of memory.

Conventionally, an application receives or generates a data object, stores the data object in its working storage, optionally processes the data object while the data object is in its working storage, and then stores the data object in the shared storage medium. At a later time, another (or the same) application retrieves the data object from the shared storage medium, stores the data object in its working storage, and optionally processes the data object while the data object is in its working storage (other actions taken with the data object are implementation specific).

Some data objects are very large. In fact, some data objects are larger than the applications' working storages. Thus, it is not possible to store such data objects (in their entireties) in the applications' working storages. Consequently, the applications cannot receive, generate, process, retrieve, or otherwise manipulate such data objects.

In some systems, very large data objects (i.e., data objects that are larger than working storage) are rejected by applications. In other words, applications do not process such data objects. This is not an ideal approach, however, since it prevents all data objects from being processed.

In other systems, very large data objects are divided into segments. A data object's segments are sequentially stored in an application's working storage, processed, and then stored in the shared storage medium. Later, another (or the same) application sequentially retrieves the data object's segments from the shared storage medium, and processes the segments.

However, in this approach it is necessary to ensure that a data object is not retrieved from the shared storage medium by any application (other than the application that is writing the data object to the shared storage medium) until all of the data object's segments have been written to the shared storage medium (this is called Requirement One). Also, it is necessary to ensure that the data object's segments are retrieved from the shared storage medium in the same order as they were stored (this is called Requirement Two). Prior to the invention described herein, there did not exist any system that operated with a shared storage medium and segmented data objects, and that satisfied these two requirements.

DISCLOSURE OF INVENTION

Briefly stated, the present invention is directed to a system and method for interacting with a shared storage medium comprising a ready queue and a staging queue. To store a data object, a determination is first made as to whether the data object is larger than available storage capacity of a working storage associated with an application. A public key is associated with the data object and is available to all applications. If the data object is larger than available storage capacity of the working storage, then a private key for the data object is generated. The private key is available to only the application.

The application then divides the data object into N segments, and causes segments 2 through N to be stored in the staging queue via the working storage. The private key is stored with each of segments 2 through N in the staging queue. Then, the application causes segment 1 of the data object, the public key, and the private key to be stored in the ready queue. The private key becomes available to all applications once stored in the ready queue.

To retrieve a data object, an application causes a record having a public key stored therein to be retrieved from the ready queue. Stored in the record are at least a portion of a data object and a private key. The application determines whether any segments of the data object are stored on the staging queue. If it is determined that one or more segments of the data object are stored on the staging queue, then the application causes any records having the private key stored therein to be retrieved from the staging queue in the order in which the records were stored on the staging queue.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF DRAWINGS

The present invention will be described with reference to the accompanying drawings, wherein.

BEST MODE FOR CARRYING OUT THE INVENTION

The invention is directed to a system and method for enabling segmented data objects to be stored in and retrieved from a shared storage medium. The invention ensures that a data object is not retrieved from the shared storage medium by any application (other than the application that is writing the data object to the shared storage medium) until all of the data object's segments have been written to the shared storage medium. Also, the invention ensures that the data object's segments are retrieved from the shared storage medium in the same order as they were stored.

Figure 1:
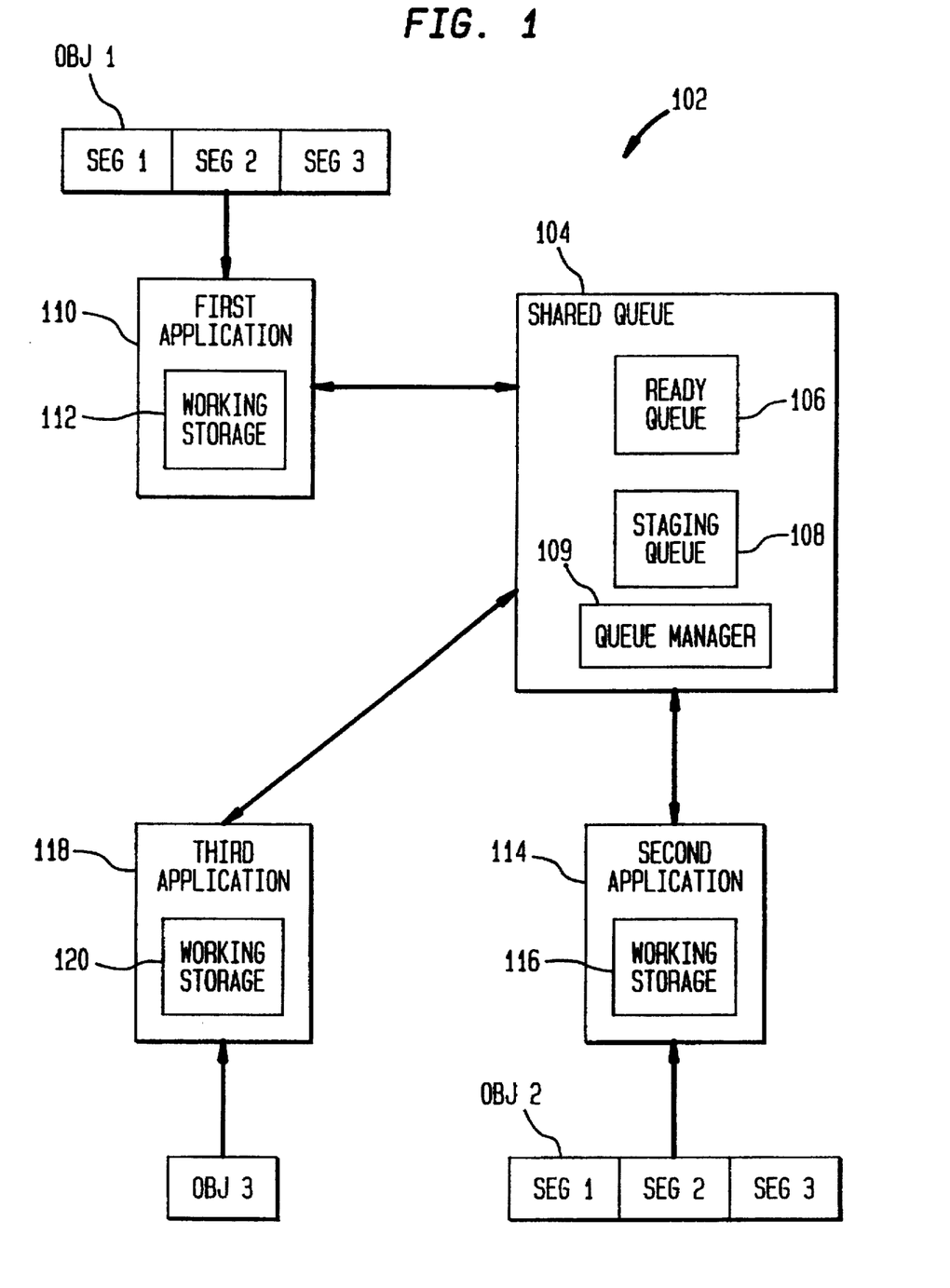
FIG. 1 is a preferred block diagram of a data processing environment of the present invention.

FIG. 1 depicts a data processing system 102 of the invention comprising a plurality of applications 110, 114, 118 interacting with a shared storage medium, such as shared queue 104. Each application 110, 114, 118 represents a computer program executing in a computer. Each application 110, 114, 118 has available for its use a working storage 112, 116, 120, respectively, that represents a finite amount of computer memory. Working storages 112, 116, 120 may be the same size, or may be different sizes.

In the example of FIG. 1, a first application 110 is shown as receiving (from a source, not shown) or generating in a well known manner a first object indicated as Obj 1. A second application 114 is shown as receiving (from a source, not shown) or generating in a well known manner a second object indicated as Obj 2. Similarly, a third application 118 is shown as receiving (from a source, not shown) or generating in a well known manner a third object indicated as Obj 3.

The shared queue 104 includes a ready queue 106 and a staging queue 108. Both the ready queue 106 and the staging queue 108 store segments of data objects transferred to the shared queue 104 from the applications 110, 114, 118. Access to the ready queue 106 and the staging queue 108 is controlled by a queue manager 109.

To store a data object in the shared queue 104, an application (called the storing application for reference purposes) generates a private key that is unique among all data objects and applications 110, 114, 118. The storing application stores the 2nd through Nth segments of the data object (where the data object is divided into N segments) in the staging queue 108. The private key is stored along with each of these 2nd through Nth segments. The private key is known and available to only the storing application. Thus, at this point, only the storing applications may access the 2nd through Nth segments stored on the staging queue 108.

After the 2nd through Nth segments have been stored in the staging queue 108, the storing application generates or obtains a public key (known and available to all of the applications 110, 114, 118) and stores the 1st segment along with the public key and the private key on the ready queue 106. Once the 1st segment is placed on the ready queue 106, the entire data object becomes accessible to all applications 110, 114, 118 that have access to the shared queue 104. In the case where the data object is not segmented, the entire data object is placed on the ready queue 106, along with the public key and a private key set to a predetermined value (preferably zero) indicating that the data object is not segmented.

To retrieve a data object from the shared queue 104, an application (called the retrieving application for reference purposes; the retrieving application and the storing application may be the same or different) uses the public key to retrieve the 1st segment of the data object from the ready queue 106. The data object is locked by the retrieving application at this point. Once the 1st segment is retrieved, the retrieving application determines if there are any additional segments. This is done by checking the private key. If the private key is not equal to the predetermined value (i.e., zero), additional segments exist. The private key is then used to locate these segments on the staging queue 108. The staging queue 108 is a first-in first-out queue for each private key. That is, for a given private key, the staging queue 108 returns the segments having that private key in the order in which they were stored in the staging queue 108. Accordingly, the additional segments of the data object are returned to the retrieving application in the order in which these segments were stored in the staging queue 108.

Figure 2:
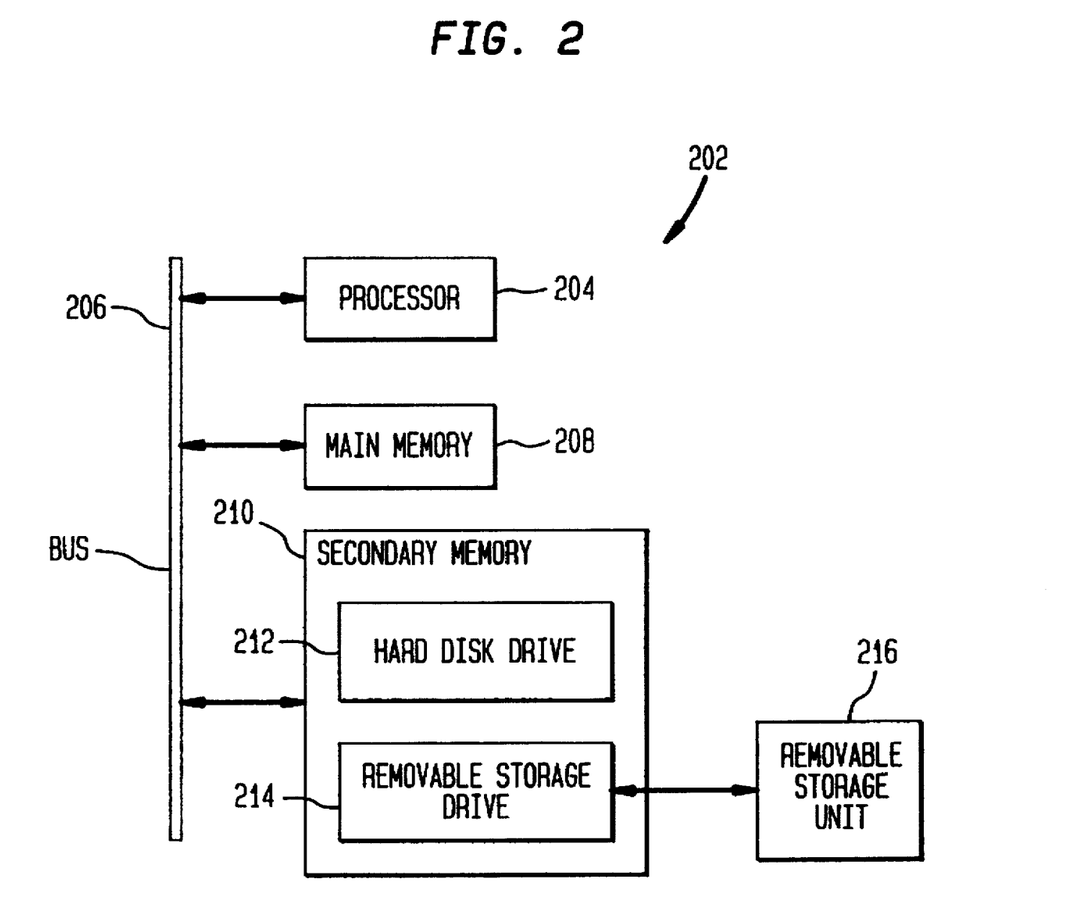
FIG. 2 is a block diagram of a computer preferably used to implement the components of the data processing environment of FIG. 1.

The applications 110, 114, 118 and the shared queue 104 may be implemented using the same computer, or may each be implemented using a different computer. (FIG. 2 depicts a preferred computer 202 useful for implementing the invention. FIG. 2 is described below.) Alternatively, applications 110, 114, 118 may be implemented using one computer, and the shared queue 104 may be implemented using another computer. Other implementations of the applications 110, 114, 118 and the shared queue 104 are within the scope and spirit of the present invention.

The computer 202 in FIG. 2 includes one or more processors, such as processor 204. The processor 204 is connected to a communication bus 206.

The computer 202 also includes a main memory 208, preferably random access memory (RAM), and a secondary memory 210. In the computer used to implement the shared queue 104, storage for the ready queue 106 and the staging queue 108 is provided by the main memory 208 and/or the secondary memory 210.

The secondary memory 210 includes, for example, a hard disk drive 212 and/or a removable storage drive 214, representing a floppy disk drive, a magnetic tape drive, a compact disk drive, etc. The removable storage drive 214 reads from and/or writes to a removable storage unit 216 in a well known manner.

Removable storage unit 216, also called a program storage device or a computer program product, represents a floppy disk, magnetic tape, compact disk, etc. As will be appreciated, the removable storage unit 216 includes a computer usable storage medium having stored therein computer software (programs) and/or data.

Computer programs (also called computer control logic) are stored in main memory 208 and/or the secondary memory 210. Such computer programs include, for example, computer programs corresponding to the applications 110, 114, 118 and the queue manager 109. These computer programs, when executed, represent the applications 110, 114, 118 and the queue manager 109. These computer programs, when executed in their respective computers, enable the processors 204 in those computers to perform the features of the present invention. Accordingly, such computer programs represent controllers of their respective computers.

In another embodiment, the invention is directed to a computer program product comprising a computer readable medium having control logic (i.e., the computer programs discussed above) stored therein. The control logic, when executed by the processors 204 in their respective computers, causes the processors 204 to perform the functions of the invention as described herein.

The operation of the invention shall now be described in greater detail.

Figure 3:
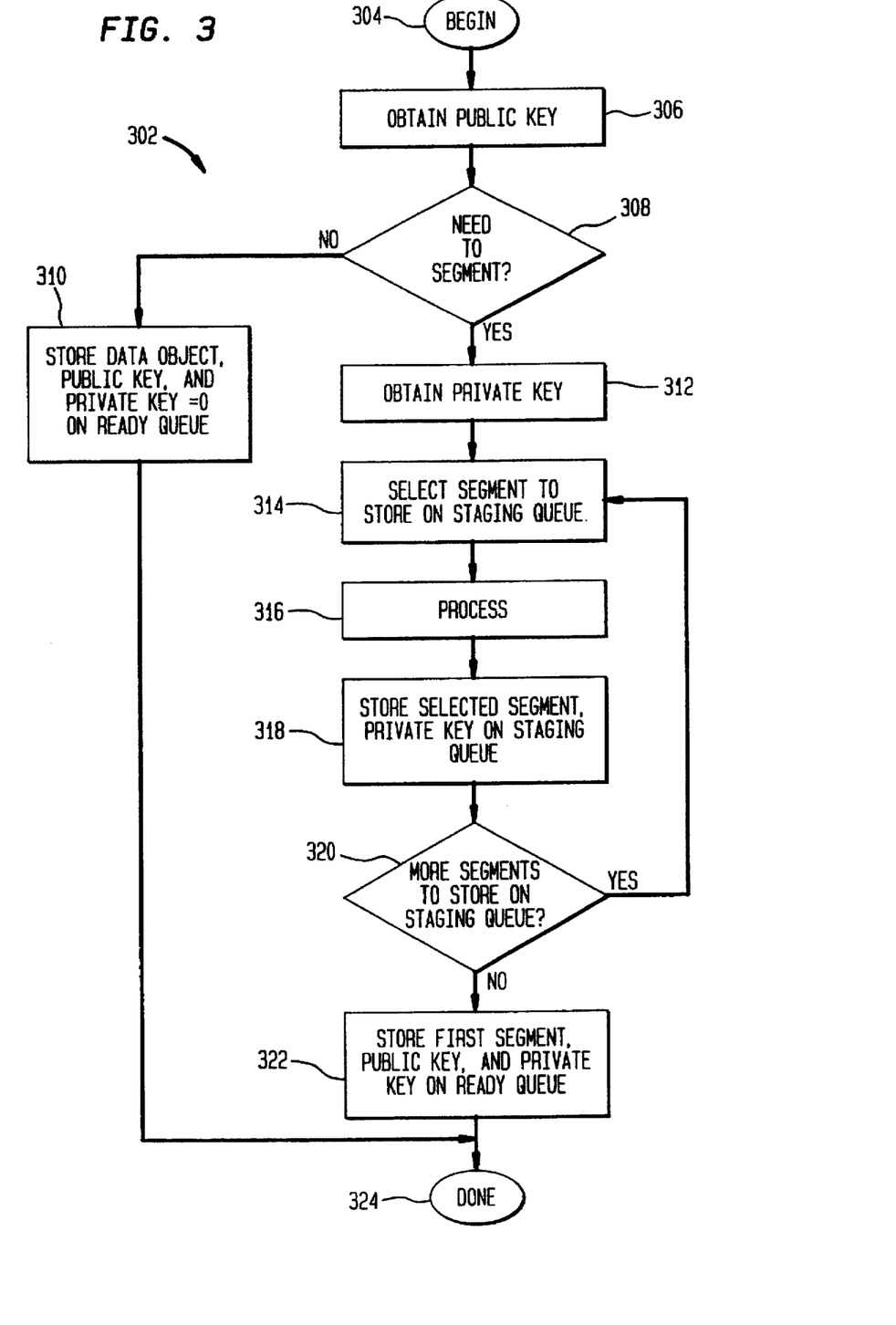
FIG. 3 is a flowchart depicting the preferred operation of the present invention where a data object is stored in the shared queue.

FIG. 3 is a flowchart 302 representing the preferred operation of the invention when a data object is stored in the shared queue 104. For illustrative purposes, flowchart 302 is described below with reference to the first application 110 storing the data object Obj 1 in the shared queue 104. Flowchart 302 begins with step 304, where control immediately passes to step 306. Note that, prior to performing step 306, the data object Obj 1 is not stored in first application 110's working storage 112.

In step 306, the first application 110 obtains a public key to associate with data object Obj 1. The public key is known to all applications 110, 114, 118 that have access to the shared queue 104. The public key may have been passed to the first application 110 along with the data object Obj 1. Alternatively, the first application 110 may generate the public key.

The public key preferably identifies a set of information to which the data object Obj 1 belongs. For example, suppose that the data processing system 102 represents a bank's transaction processing system, and that the shared queue 104 is used to store bank transactions. In this case, the data object Obj 1 may represent a bank transaction made by customer C1, and the public key may represent customer C1's account number at the bank. Suppose data object Obj 3 in FIG. 1 also represents a bank transaction made by customer C1. In this case, the public key of data object Obj 3 would also be equal to customer C1's account number at the bank.

For illustrative purposes, assume that the public key is set equal to M.

In step 308, the first application 110 determines whether it is necessary to segment the data object Obj 1. It is necessary to segment the data object Obj 1 if the data object Obj 1 is larger than the available storage capacity of the working storage 112. It is not necessary to segment the data object Obj 1 if the data object Obj 1 is smaller than the available storage capacity of the working storage 112 (i.e., it is not necessary to segment the data object Obj 1 if the data object Obj 1 can be stored in the working storage 112 without overwriting any data or programs already stored in the working storage 112).

If it is determined in step 308 that it is not necessary to segment the data object Obj 1, then step 310 is performed. In step 310, the first application 110 stores the entire data object Obj 1 in the ready queue 106. The public key (determined in step 306) is stored with the data object Obj 1 in the ready queue 106, along with a private key that has been set equal to a predetermined value (preferably zero) indicating that data object Obj 1 contains no other segments. Flowchart 302 is complete after performing step 310, as indicated by step 324. If, in step 308, it is determined that it is necessary to segment the data object Obj 1, then step 312 is performed. In step 312, the first application 110 logically divides the data object Obj 1 into N segments, where:

N=integer roundup ((size of Obj 1)/(segment size)).

The "integer roundup" function sets N equal to the smallest integer value that is greater than or equal to the value: (size of Obj 1)/(segment size).

The 1st through (N−1)th segments will be the same size (i.e., segment size). If (size of Obj 1) is not a multiple of (segment size), then the size of the Nth segment will not be equal to segment size. Optionally, the Nth segment may be padded with nulls to make its size equal to segment size.

The segment size is implementation dependent, and may be the same for all applications 110, 114, 118, or may differ among applications 110, 114, 118.

As shown in the example of FIG. 1, N is equal to three, and the data object Obj 1 has been separated into three segments, denoted as Seg 1, Seg 2, and Seg 3. Also in step 312, the first application 110 generates a private key for the data object Obj 1. The private key is unique among all applications 110, 114, 118 and all data objects. Preferably, the private key is set equal to a concatenation of the first application 110's name and the current date/time stamp, although any well known data that uniquely identifies the data object Obj 1 could alternatively be used. For illustrative purposes, assume that the private key is set equal to A.

In step 314, the first application 110 selects one of the segments of the data object Obj 1 to store on the staging queue 108. Ultimately, the 2nd through Nth segments of the data object Obj 1 (where N is equal to three in the example of FIG. 1) will be stored on the staging queue 108 (in ascending order by segment number). Accordingly, in step 314 the first application 110 selects the 2nd segment, i.e., segment Seg 2. The first application 110 stores the selected segment, segment Seg 2, in its working storage 112.

Figure 4:
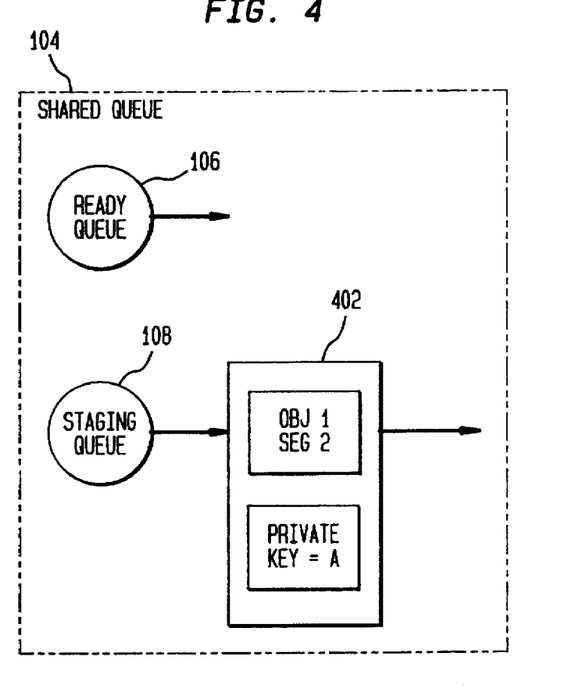
FIG. 4 is used to illustrate the preferred operation of the present invention where a selected segment 2 and the private key A have been stored in a new record of the staging queue.

In step 316, the first application 110 optionally processes the selected segment Seg 2 while the selected segment Seg 2 is stored in its working storage 112. The details of such processing is implementation dependent. In step 318, the first application 110 stores the selected segment Seg 2 and the private key A in the staging queue 108. Preferably, the first application 110 performs step 318 by requesting the queue manager 109 to store the selected segment Seg 2 and the private key A in the staging queue 108. In response to this request, the queue manager 109 creates a new record in the staging queue 108, and stores the selected segment Seg 2 and the private key A in this new record. This is shown in FIG. 4, where the selected segment Seg 2 and the private key A have been stored in new record 402 of staging queue 108.

In step 320, the first application 110 determines whether there are any additional segments in the data object Obj 1 that need to be stored on the staging queue 108. If there are, then control returns to step 314 to select the next segment. Otherwise, control flows to step 322.

Figure 5:
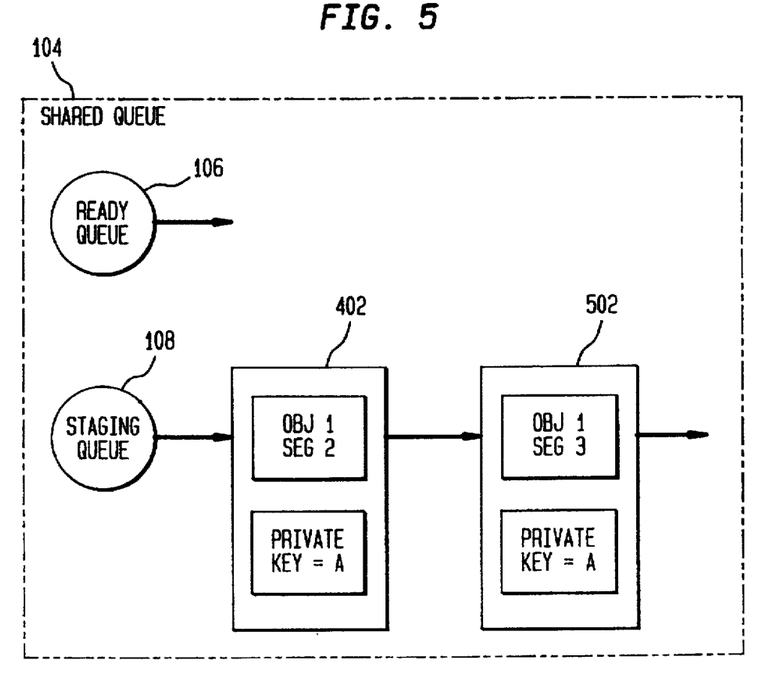
FIG. 5 is used to illustrate the preferred operation of the present invention where a selected segment 3 and the private key A have been stored in another new record of the staging queue.

In the example of FIG. 1, the data object Obj 1 does contain another segment, segment Seg 3, that must be stored on the staging queue 108. Thus, control flows to step 314, where segment Seg 3 is selected. The selected segment Seg 3 is optionally processed in step 316, and then stored on the staging queue 108 along with the private key A in step 318. This is shown in FIG. 5, where the selected segment Seg 3 and the private key A have been stored in new record 502 of the staging queue 108. After segment Seg 3 has been stored on the staging queue 108, the first application 110 determines in step 320 that the data object Obj 1 contains no other segments that must be stored on the staging queue 108. Accordingly, control moves to step 322.

(As noted above, the private key A is known only to the first application 110, i.e., the application that is storing the data object Obj 1 on the staging queue 108. Thus, only the first application 110 has access to Obj 1's segments Seg 2 and Seg 3 on the staging queue 108. The other applications do not have access to segment Seg 2 or segment Seg 3, since these other applications do not know the private key A. Thus, the present invention ensures that data object Obj 1 cannot be accessed by any application, other than the application that is storing it, until it has been completely stored in the shared queue 104.)

Figure 6:
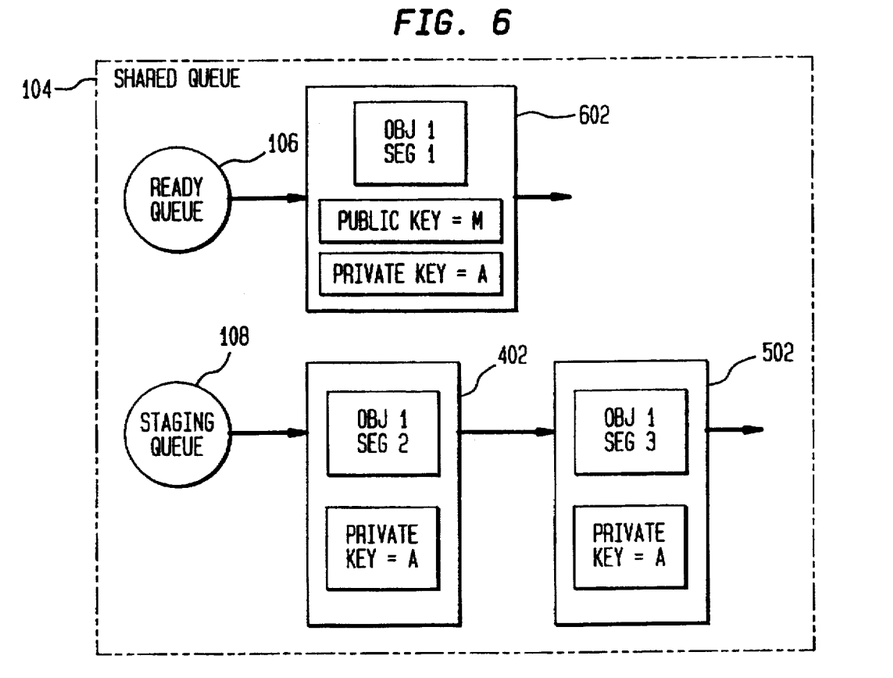
FIG. 6 is used to illustrate the preferred operation of the present invention where a selected segment 1, the private key A and the public key M have been stored in a new record of the ready queue.

In step 322, the first application 110 stores the first segment Seg 1, the private key A, and the public key M on the ready queue 106. Preferably, the first application 110 performs step 322 by requesting the queue manager 109 to store the first segment Seg 1, the private key A, and the public key M in the ready queue 106. In response to this request, the queue manager 109 creates a new record in the ready queue 106, and stores the first segment Seg 1, the private key A, and the public key M in this new record. This is shown in FIG. 6, where the first segment Seg 1, the private key A, and the public key M have been stored in new record 602 of the ready queue 106. The public key M is known by and available to all of the applications that have access to the shared queue 104. Thus, at this point, all applications may access data object Obj 1 from the shared queue 104.

Flowchart 302 is complete after step 322 is performed, as indicated by step 324.

Figure 7:
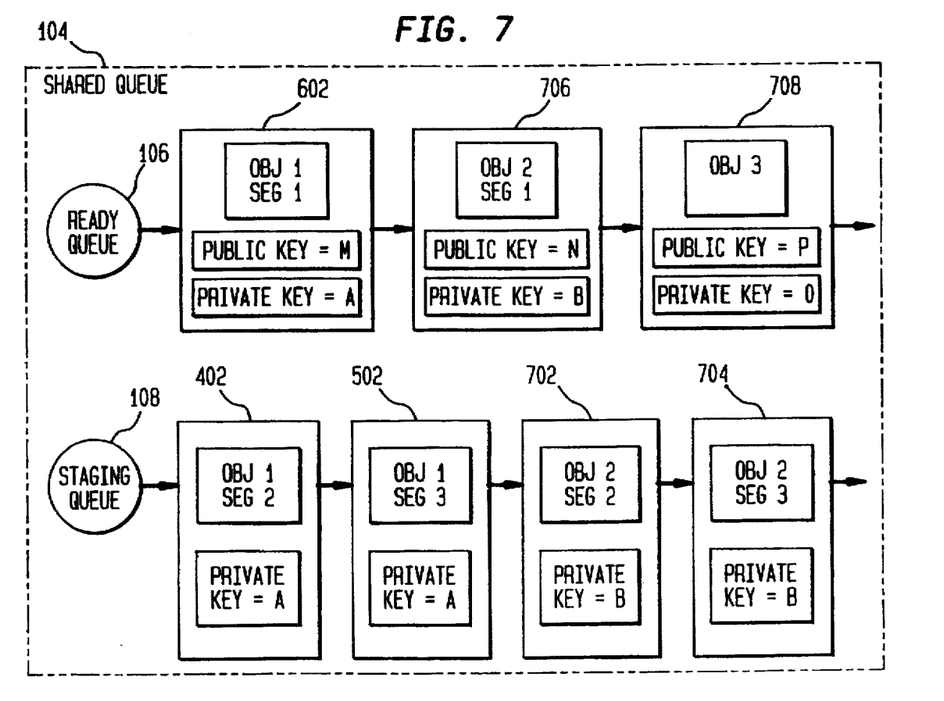
FIG. 7 is used to illustrate the preferred operation of the present invention where data objects 2 and 3 have been stored in the shared queue.

The steps of flowchart 302 are performed by the second application 114 when it stores data object Obj 2 on the shared queue 104, and by the third application 118 when it stores data object Obj 3 on the shared queue 104. FIG. 7 shows the ready queue 106 and the staging queue 108 after data objects Obj 2 and Obj 3 have been stored on the shared queue 104. Segments Seg 2 and Seg 3 of data object Obj 2 have been stored in records 702 and 704, respectively, of staging queue 108. Data object Obj 2 has a private key equal to B. The 1st record Seg 1 of data object Obj 2 is stored in record 706 of the ready queue 106. Data object Obj 2 has a public key equal to N.

Data object Obj 3 was not big enough to segment. Thus, it is stored completely in record 708 of the ready queue 106. Data object Obj 3 has a public key equal to P. Note that its private key has been set to the predetermined value (i.e., zero) that indicates that the data object has not been divided.

Actual implementation of the ready queue 106 and the staging queue 108 is implementation dependent. The ready queue 106 and the staging queue 108 are shown in FIG. 7 to resemble a linked list, although this is not necessarily the case. In fact, the invention preferably does not employ pointers in the queue records 402, 502, 602, 702, 704, 706, 708 to implement the ready queue 106 or the staging queue 108. Thus, the records in the staging queue 108 need not be linked to one another. Likewise, the records in the ready queue 106 need not be linked to one another.

Any well known queue implementation of the ready queue 106 and the staging queue 108 can be used in the invention, as long as the staging queue 108 is made to operate on a per private key first-in first-out basis. That is, for a given private key, segments stored on the staging queue 108 and having the given private key are retrieved in the order in which they were stored on the staging queue 108. Also, the ready queue 106 should operate on a per public key first-in first-out basis. That is, for a given public key, records stored on the ready queue 106 and having the given public key are retrieved in the order in which they were stored on the ready queue 106. (Alternatively, the ready queue 106 may operate on a last-in first-out basis, or any other implementation-specific queue retrieval protocol.) Retrieval from the staging queue 108 and the ready queue 106 in this manner is preferably controlled by the queue manager 109.

Figure 8:
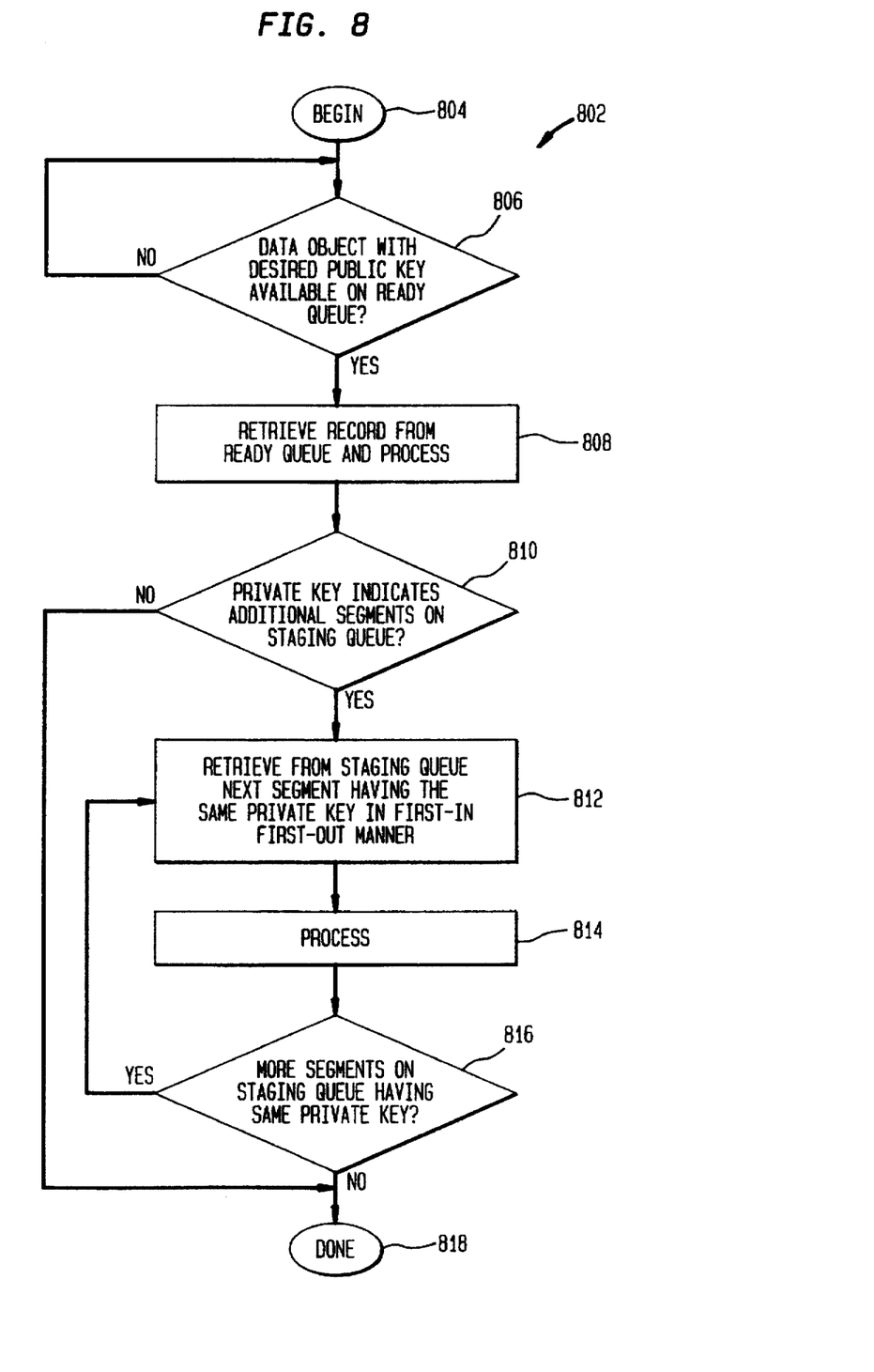
FIG. 8 is a flowchart depicting the preferred operation of the present invention where a data object is retrieved from the shared queue.

FIG. 8 is a flowchart 802 representing the preferred operation of the invention when a data object is retrieved from the shared queue 104. For illustrative purposes, flowchart 802 is described below with reference to the third application 118 retrieving data object Obj 2 from the shared queue 104. Flowchart 802 begins with step 804, where control immediately passes to step 806. In step 806, the third application 118 determines whether a data object with public key N is available on the ready queue 106. (The third application 118 may be responsible for processing data objects with public key N.) Preferably, the third application 118 performs step 806 by sending an appropriate inquiry to the queue manager 109. Alternatively, the third application 118 may register with the queue manager 109. The queue manager 109 would then send a message to the third application 118 whenever a data object with public key N becomes available on the ready queue 106.

Control flows to step 808 once a data object with public key N becomes available on the ready queue 106. In step 808, the third application 118 retrieves a record from the ready queue 106 having stored therein the public key N. (At this point, data object Obj 2 becomes locked, such that no other application may access the segments of data object Obj 2 in either the ready queue 106 or the staging queue 108.) Preferably, the third application 118 performs step 808 by requesting the queue manager 109 to retrieve a record from the ready queue 106 having stored therein the public key N. In response to this request, the queue manager 109 scans the ready queue 106 and retrieves a record having stored therein the public key N. If there are multiple records with public key N, then the queue manager 109 retrieves according to some queue retrieval protocol, such as first-in first-out (for example), such that the record that was earliest stored is retrieved from the ready queue 106. Last-in first-out or some other queue retrieval protocol could also be used.

In the example of FIG. 7, record 706 is retrieved from the ready queue 106 and transferred to the third application 118. This record 706 contains segment Seg 1 of the data object Obj 2, the public key N, and the private key B.

The third application 118 stores segment Seg 1 of the data object Obj 2, the public key N, and the private key B in its working storage 120, and optionally processes segment Seg 1. Such processing may include transferring segment Seg 1 to a destination, such as another application or a storage device (not shown). Then, the third application 118 may clear segment Seg 1 from its working storage 120 to make room for the next segment (if other segments exist, as described below).

In step 810, the third application 118 determines whether data object Obj 2 was segmented, i.e., whether segments associated with data object Obj 2 exist on the staging queue 108. This is done by reference to the private key contained in the retrieved record 706. If the private key is not equal to the predetermined value (i.e., zero), then segments associated with data object Obj 2 exist on the staging queue 108. In this case, step 812 is performed. If, instead, the private key is equal to the predetermined value, then no segments associated with data object Obj 2 exist on the staging queue 108. In this case, operation of flowchart 802 is complete, as indicated by step 818. In the example of FIG. 7, the private key is equal to B. Thus, step 812 is performed since segments associated with data object Obj 2 exist on the staging queue 108.

In step 812, the third application 118 retrieves from the staging queue 108 a segment having a private key equal to B (i.e., a segment associated with data object Obj 2). In particular, the earliest saved segment having a private key equal to B is retrieved from the staging queue 108. Preferably, the third application 118 performs step 812 by requesting that the queue manager 109 retrieve a record from the staging queue 108 having a private key equal to B. As discussed above, the staging queue 108 operates on a per private key first-in first-out basis. Thus, in response to this request, the queue manager 109 retrieves record 702 from the staging queue 108. This record 702 has stored therein segment Seg 2 from data object Obj 2, and private key B. It is noted that segment Seg 2 contained in record 702 was stored before segment Seg 3 in record 704. Thus, in retrieving record 702, the queue manager 109 ensures that the per private key first-in first-out operational requirement of the staging queue 108 is satisfied.

In step 814, the third application 118 stores segment Seg 2 in its working storage 120, and optionally processes segment Seg 2 in an implementation dependent manner. Such processing may include transferring segment Seg 2 to a destination, such as another application or a storage device (not shown). Then, the third application 118 clears segment Seg 2 from its working storage 120 to make room for the next segment (if other segments exist, as described below).

In step 816, the third application 118 determines whether there are additional segments in the staging queue 108 associated with data object Obj 2 (i.e., having a private key equal to B). The third application 118 preferably performs step 816 by sending an appropriate query to the queue manager 109. Alternatively, the queue manager 109 may send a "none available" message or a "this is the last one" message when, in step 812, the third application 118 attempted to retrieve a segment with private key equal to B from the staging queue 108. If more segments with private key equal to B exist on the staging queue 108, then control returns to step 812. Otherwise, operation of flowchart 802 is complete, as indicated by step 818.

In the example of FIG. 7, the third application 118 determined that another segment with private key equal to B existed on the staging queue 108. Thus, control returned to step 812, where record 704 was retrieved. Segment Seg 3 of data object Obj 2 was stored in working storage 120 of the third application 118 and optionally processed in step 814. In step 816, the third application 118 determined that no more segments with private key equal to B existed on the staging queue 108.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A method for interacting with a shared storage medium comprising a ready queue and a staging queue, comprising the steps of:
   (1) determining whether a data object is larger than available storage capacity of a working storage associated with an application, a public key being associated with the data object, said public key being available to all applications;
   (2) if the data object is larger than available storage capacity of the working storage, then:
      (a) generating a private key for the data object, said private key being available to only said application;
      (b) dividing the data object into N segments;
      (c) causing segments 2 through N of the data object to be stored in said staging queue via said working storage, said private key being stored with each of said segments 2 through N in said staging queue;
      (d) causing segment 1 of the data object, said public key, and said private key to be stored in said ready queue, wherein said private key becomes available to all applications once stored in said ready queue.

2. The method of claim 1, further comprising the step of:
   (3) if the data object is not larger than available storage capacity of the working storage, then causing the data object, the public key, and a private key equal to a predetermined key value to be stored in the ready queue, wherein the predetermined key value indicates that the data object is stored in the ready queue in its entirety.

3. The method of claim 1, wherein step (a) comprises the step of setting said private key equal to a concatenation of an identifier of said application with a current date/time stamp.

4. The method of claim 1, further comprising the steps of:
   (3) causing a record having a second public key stored therein to be retrieved from said ready queue, said record also having stored therein at least a portion of a second data object and a second private key;
   (4) determining whether any segments of said second data object are stored on said staging queue; and
   (5) if it is determined that one or more segments of said second data object are stored on said staging queue, then causing any records having said second private key stored therein to be retrieved from said staging queue in the order in which said any records were stored on said staging queue.

5. The method of claim 4, wherein step (4) comprises the step of determining that one or more segments of said second data object are stored on said staging queue if said second private key is equal to any value other than a predetermined key value.

6. A method for interacting with a shared storage medium comprising a ready queue and a staging queue, comprising the steps of:
   (1) causing a record having a public key stored therein to be retrieved from said ready queue, said record also having stored therein at least a portion of a data object and a private key;
   (2) determining whether any segments of said data object are stored on said staging queue; and
   (3) if it is determined that one or more segments of said data object are stored on said staging queue, then causing any records having said private key stored therein to be retrieved from said staging queue in the order in which said any records were stored on said staging queue.

7. The method of claim 6, wherein step (2) comprises the step of determining that one or more segments of said data object are stored on said staging queue if said private key is equal to any value other than a predetermined key value.

8. A method for managing a shared storage medium comprising a ready queue and a staging queue, comprising the steps of:
   (1) receiving (N−1) first requests to store (N−1) portions of a data object along with a private key in said staging queue;
   (2) storing said (N−1) portions of the data object along with a private key in said staging queue on a per private key first-in first-out basis;
   (3) receiving a second request to store a portion of the data object along with a public key and the private key in said ready queue; and
   (4) storing said portion of the data object along with the public key and the private key in said ready queue.

9. A method for managing a shared storage medium comprising a ready queue and a staging queue, comprising the steps of:
   (1) receiving a first request to retrieve a record having a particular public key stored therein from said ready queue;

(2) retrieving a record having said particular public key from said ready queue, said record also having stored therein at least a portion of a data object and a private key;

(3) receiving (N−1) second requests to retrieve from said staging queue records having stored therein said private key; and (4) retrieving (N−1) records from said staging queue, each of said (N−1) records having stored therein one of (N−1) segments of the data object and the private key, said (N−1) records being retrieved from said staging queue in the order in which they were stored in said staging queue.

10. An application that interacts with a shared storage medium comprising a ready queue and a staging queue, comprising:

means for determining whether a data object is larger than available storage capacity of a working storage associated with an application, a public key being associated with the data object, said public key being available to all applications;

private key generating means, responsive to a determination that the data object is larger than available storage capacity of the working storage, for generating a private key for the data object, said private key being available to only said application; dividing means, responsive to operation of said private key generating means, for dividing the data object into N segments;

staging queue storing means, responsive to operation of said dividing means, for causing segments 2 through N of the data object to be stored in said staging queue via said working storage, said private key being stored with each of said segments 2 through N in said staging queue; ready queue storing means, responsive to operation of said staging queue storing means, for causing segment 1 of the data object, said public key, and said private key to be stored in said ready queue, wherein said private key becomes available to all applications once stored in said ready queue.

11. The application of claim 10, further comprising:

means, responsive to a determination that the data object is not larger than available storage capacity of the working storage, for causing the data object, the public key, and a private key equal to a predetermined key value to be stored in the ready queue, wherein the predetermined key value indicates that the data object is stored in the ready queue in its entirety.

12. The application of claim 10, wherein said private key generating means comprises means for setting said private key equal to a concatenation of an identifier of said application with a current date/time stamp.

13. An application for interacting with a shared storage medium comprising a ready queue and a staging queue, comprising:

means for causing a record having a public key stored therein to be retrieved from said ready queue, said record also having stored therein at least a portion of a data object and a private key;

determining means for determining whether any segments of said data object are stored on said staging queue; and means, responsive to a determination that one or more segments of said data object are stored on said staging queue, for causing any records having said private key stored therein to be retrieved from said staging queue in the order in which said any records were stored on said staging queue.

14. The application of claim 13, wherein said determining means comprises means for determining that one or more segments of said data object are stored on said staging queue if said private key is equal to any value other than a predetermined key value.

15. A queue manager for managing a shared storage medium comprising a ready queue and a staging queue, comprising:

means for receiving (N−1) first requests to store (N−1) portions of a data object along with a private key in said staging queue;

means for storing said (N−1) portions of the data object along with a private key in said staging queue on a per private key first-in first-out basis;

means for receiving a second request to store a portion of the data object along with a public key and the private key in said ready queue; and means for storing said portion of the data object along with the public key and the private key in said ready queue.

16. A queue manager for managing a shared storage medium comprising a ready queue and a staging queue, comprising:

means for receiving a first request to retrieve a record having a particular public key stored therein from said ready queue;

means for retrieving a record having said particular public key from said ready queue, said record also having stored therein at least a portion of a data object and a private key;

means for receiving (N−1) second requests to retrieve from said staging queue records having stored therein said private key; and means for retrieving (N−1) records from said staging queue, each of said (N−1) records having stored therein one of (N−1) segments of the data object and the private key, said (N−1) records being retrieved from said staging queue in the order in which they were stored in said staging queue.

17. A shared queue, comprising:

a ready queue;

a staging queue; and a queue manager, comprising:

means for storing records in and retrieving records from said ready queue; and means for storing records in and retrieving records from said staging queue on a per private key first-in first-out basis.

18. The shared queue of claim 17, wherein said queue manager further comprises:

means for receiving (N−1) first requests to store (N−1) portions of a data object along with a private key in said staging queue;

means for storing said (N−1) portions of the data object along with a private key in said staging queue on a per private key first-in first-out basis;

means for receiving a second request to store a portion of the data object along with a public key and the private key in said ready queue; and means for storing said portion of the data object along with the public key and the private key in said ready queue.

19. The shared queue of claim 17, wherein said queue manager further comprises:

means for receiving a first request to retrieve a record having a particular public key stored therein from said ready queue;

means for retrieving a record having said particular public key from said ready queue, said record also having stored therein at least a portion of a data object and a private key;

means for receiving (N−1) second requests to retrieve from said staging queue records having stored therein said private key; and means for retrieving (N−1) records from said staging queue, each of said (N−1) records having stored therein one of (N−1) segments of the data object and the private key, said (N−1) records being retrieved from said staging queue in the order in which they were stored in said staging queue.

20. A computer program product comprising a computer readable medium having computer program logic recorded thereon, the computer program logic causes a computer to perform specific functions, the computer comprising a shared queue having a ready queue and a staging queue, wherein said computer program logic comprises:

means for enabling the computer to store records in and retrieve records from said ready queue; and means for enabling the computer to store records in and retrieve records from said staging queue on a per private key first-in first-out basis.

21. The computer program product of claim 20, wherein said computer program logic further comprises:

means for enabling the computer to receive (N−1) first requests to store (N−1) portions of a data object along with a private key in said staging queue;

means for enabling the computer to store said (N−1) portions of the data object along with a private key in said staging queue on a per private key first-in first-out basis;

means for enabling the computer to receive a second request to store a portion of the data object along with a public key and the private key in said ready queue; and means for enabling the computer to store said portion of the data object along with the public key and the private key in said ready queue.

22. The computer program product of claim 20, wherein said computer program logic further comprises:

means for enabling the computer to receive a first request to retrieve a record having a particular public key stored therein from said ready queue;

means for enabling the computer to retrieve a record having said particular public key from said ready queue, said record also having stored therein at least a portion of a data object and a private key;

means for enabling the computer to receive (N−1) second requests to retrieve from said staging queue records having stored therein said private key; and means for enabling the computer to retrieve (N−1) records from said staging queue, each of said (N−1) records having stored therein one of (N−1) segments of the data object and the private key, said (N−1) records being retrieved from said staging queue in the order in which they were stored in said staging queue.

* * * * *

UNITED STATES PATENT AND TRADEMARK OFFICE
CERTIFICATE OF CORRECTION

PATENT NO. : 5,706,513

DATED : January 6, 1998

INVENTORS : Bahls *et al.*

It is certified that an error appears in the above-identified patent and that said Letters Patent is hereby corrected as shown below.

On the cover page, in item [54], please delete "AN" after the word "QUEUING" and insert --AND-- in place thereof;

In Column 1, in the title, please delete "AN" after the word "QUEUING" and insert --AND-- in place thereof.

Signed and Sealed this

Twenty-second Day of September, 1998

Attest:

BRUCE LEHMAN

*Attesting Officer*   *Commissioner of Patents and Trademarks*